US005855834A

United States Patent [19]

Ysbrand

[11] Patent Number: 5,855,834

[45] Date of Patent: Jan. 5, 1999

[54] METHOD OF PRODUCING A MOLDED WOVEN CABLE

[76] Inventor: Floyd Ysbrand, 2500 Davis Blvd., P.O. Box 1786, Joplin, Mo. 64802

[21] Appl. No.: 629,689

[22] Filed: Apr. 9, 1996

Related U.S. Application Data

[60] Continuation of Ser. No. 210,867, Mar. 21, 1994, Pat. No. 5,560,884, which is a division of Ser. No. 980,478, Nov. 23, 1992, Pat. No. 5,331,115.

[51] Int. Cl.[6] .......................... B29C 45/14; B29C 45/36

[52] U.S. Cl. ...................... 264/277; 264/261; 264/328.12

[58] Field of Search .................................. 264/277, 275, 264/271.1, 328.1, 328.12, 328.2, 261, 263, 272.12, 272.14; 425/DIG. 249, 121, 123, 127, 129.1, 175

[56] References Cited

U.S. PATENT DOCUMENTS

| | | | |
|---|---|---|---|
| 3,264,396 | 8/1966 | Beesley et al. | 264/328.12 |
| 3,473,986 | 10/1969 | Hureau | 156/51 |
| 3,627,863 | 12/1971 | Fairbanks | 264/103 |
| 3,627,903 | 12/1971 | Plummer | 174/117 M |
| 3,758,359 | 9/1973 | Kimikazu Azuma | 156/244 |
| 3,909,508 | 9/1975 | Ross | 174/117 M |
| 3,928,519 | 12/1975 | Kashiyama et al. | 264/40 |
| 4,123,304 | 10/1978 | Gaudette . | |
| 4,130,450 | 12/1978 | Bahder et al. | 156/48 |
| 4,301,109 | 11/1981 | Kain | 264/274 |
| 4,386,043 | 5/1983 | Takeshima | 264/328.12 |
| 4,404,744 | 9/1983 | Stenz et al. | 264/272.14 |
| 4,429,179 | 1/1984 | Chynoweth | 174/117 M |
| 4,504,696 | 3/1985 | Piper | 174/32 |
| 4,762,584 | 8/1988 | Andreasen et al. | 264/274 |
| 4,806,405 | 2/1989 | Liebl | 264/328.12 |
| 4,808,771 | 2/1989 | Orr, Jr. | 174/72 R |
| 4,822,434 | 4/1989 | Sawaki et al. | 264/272.14 |
| 4,923,537 | 5/1990 | Matsushima | 264/272.14 |
| 4,956,524 | 9/1990 | Karkow | 174/117 M |
| 5,201,903 | 4/1993 | Corbett, III et al. | 264/272.14 |
| 5,336,456 | 8/1994 | Eskildsen et al. | 264/272.14 |

FOREIGN PATENT DOCUMENTS 1479957 7/1989 Russian Federation .

*Primary Examiner*—Angela Ortiz
*Attorney, Agent, or Firm*—Sixbey, Friedman, Leedom & Ferguson; Frank P. Presta; Joseph S. Presta

[57] ABSTRACT

A method of production provides a plurality of conductors and a plastic-like material interlaced with the conducts in a woven pattern to hold and secure the conductors in a spaced relationship. The woven pattern of plastic-like material is formed by an injection molding process. The cable can have a plurality of conductors generally labeled as a first conductor, second conductor, and continuing to a last conductor held in a spaced relationship with each other, and each of the conductors has a beginning end and a terminating end. A narrow strip of the plastic-like compound forms a beginning base around the conductors, then it is woven over the first conductor, under the second conductor, over the third conductor ad continues in this woven pattern until the last conductor is included. Then the strip continues around the last conductor and is woven over the conductors in the opposite manner back to the first conductor, weaving the conductors together in a spaced relationship. This woven pattern is repeated to an ending position and there forms an ending base around the conductors near the ending position.

6 Claims, 2 Drawing Sheets

METHOD OF PRODUCING A MOLDED WOVEN CABLE

This application is a continuation of application Ser. No. 08/210,867 filed Mar. 21, 1994, now U.S. Pat. No. 5,560,884, which is a divisional of application Ser. No. 07/980,478 filed Nov. 23, 1992, now U.S. Pat. No. 5,331,115.

BACKGROUND OF THE INVENTION

Field of the Invention

The present invention relates to a molded woven cabling and a method of production and more particularly to multiple conductor cabling woven with a plastic like molding compound and a method of production of molded woven cabling.

Electric cables come in a wide variety of shapes, types of conductors, number of conductors, insulation, and configurations. Electrical cables can be as simple as a single conductor with a simple insulator on the exterior of the conductor, or they can be very complex having multiple conductors of different sizes and different types with varying terminations or exit points along the length. The cabling can also have various termination devices on the ends of the conductors or they can be left bare, depending on the particular application.

Electrical cables of some sort are used in practically every device incorporating any electronics or electronic devices. Cabling is required to tie in the source of electricity to the electronics and to deliver and transfer electronic signals to other electronic device, to gauges, meters, lights or other visual indicators, to allow communications between devices and coordination of activities. Any time any type of electronic signals or current has to be delivered or transferred from one device to another electrical cables are generally in use.

Typically, when there are multiple signals or currents being transmitted between devices in most modern day apparatuses or machines, a custom electrical cable having multiple conductors and multiple terminations is used. Custom made electrical cables are used in automobiles, trucks, airplane, jets, rockets, other types of military apparatuses, computers, televisions, some telephones, stereos, and practically every other device imaginable employing any type of electronics.

In the past electrical cables have been made by several different configurations and methods. Typically, multiple conductors are contained within a sheath or covering. The sheath can be wrapped or molded by several different types of methods known in the art. Molding techniques result in a cable having multiple conductors surrounded by some sort of molding compound. The cable can be in one of several different configurations. The cable can be a flat ribbon, or round in the most common configurations. The multiple conductors can all run parallel to each other or they can be wrapped around each other in some sort of woven pattern, depending on the particular application and types of conductors.

In one instance of the prior art, electrical conductors are woven in a particular pattern such that the primary signal wire has non-signal carrying wires wrapped around it. This provides protection from interference from other signals. The non-signal wires can be current-carrying conductors or ground conductors. The woven wires are then surrounded by an insulating material in most instances.

Particular applications having custom cabling often have conductors entering and leaving the cable at several different locations, with each having some sort of termination device. These type of cables are often prepared in some sort of jig designed specifically for the particular application. The wires are installed individually or in particular groups along the jig. Each of the wires or groups is added to the cable at particular locations leaving a sufficient length extending from the cable for a termination device and to enable the termination device to connect to some electrical apparatus. Once all the wires are in place, the cable is wrapped with an insulating material or subjected to a molding process where the cable is covered in the insulating material. The insulating material in the latter often completely fills all voids between the wire and completely surrounds the wires forming an exterior insulating material around the cable.

The cabling of the prior art has several disadvantages. Once multiple conductors are included within a cable it is very difficult to make a repair to a single conductor. Typically, the cable outer insulating material has to be removed over a significant length to locate the problem and most be completely removed from end to end if the conductor has to be replaced. If the conductors are included in any sort of woven pattern, a single conductor typically can not be removed or repaired. If the conductor is included in any sort of molded sheath it may be impossible to remove or repair a single conductor without destroying the integrity of the cable.

Another disadvantage is the weight of the insulating material used in making the cable. Weight of the insulating material in some instances may actually exceed the weight of the conductors in the cable. Some applications where electrical cabling is used may be very critical. This is especially true in instances where the apparatus in which the cable is used has some sort of motion or locomotion, such as in automobiles, aircraft, spacecraft, and other military and non-military applications just to name a few.

SUMMARY OF THE DISCLOSURE

Accordingly, it is an object of the present invention to provide an molded woven cabling and a method of production that is adapted to produce an electrical cable overcoming several disadvantages of the prior art.

Another object of the present invention is to provide a molded woven cable that is constructed to provide a cable in which the overall weight of the cable is significantly reduced compared to similar cables currently known in the art.

A further object of the present invention is to provide a molded woven cable in which a single conductor within the cable can be readily removed, repaired, or replaced without compromising the integrity of the entire cable.

Still another object of the present invention is to provide a molded woven cable that may be adapted to form a custom cable for particular applications having multiple entries end exits from the cable with entry and exit ends having particular termination devices.

Still a further object of the present invention is to provide a method of production of a molded woven cable that is adapted for creating a woven molded cable in accordance with this invention.

Yet another object of the present invention is to provide a molded woven cable having a greater degree of flexibility.

To accomplish the foregoing and other objects of this invention there is provided molded woven cabling and a method of production and more particularly to a woven cable for electrical conductors in which the conductors are woven, not by the conductors, but rather by a plastic like material molded in place around the individual conductors.

The molded woven cable and a method of production generally consists of a plurality of conductors and a plastic like material interlaced with the conductors in a woven pattern to hold and secure the conductors in a spaced relationship. The woven pattern of plastic like material is typically formed by an injection molding process.

The cable can have a plurality of conductors generally labeled as a first conductor, second conductor, and continuing to a last conductor held in a spaced relationship with each other by the woven pattern of the plastic-like material. A narrow strip of the plastic like compound forms a beginning base around the conductors, then it is woven over the first conductor, under the second conductor, over the third conductor and continuing in this woven pattern until the last conductor is included. Then around the last conductor and woven back over the conductors in the opposite manner to the first conductor weaving the conductors together in a spaced relationship This woven pattern is repeated to an ending position and forming an ending base around the conductors near the ending position.

The above-mentioned objects and other objects and features of the present invention will be better understood and appreciated from the following detailed description of the main embodiment thereof, selected for purposes of illustration and shown in the accompanying drawings.

DETAILED DESCRIPTION OF THE PREFERRED EMBODIMENT

Figure 3:
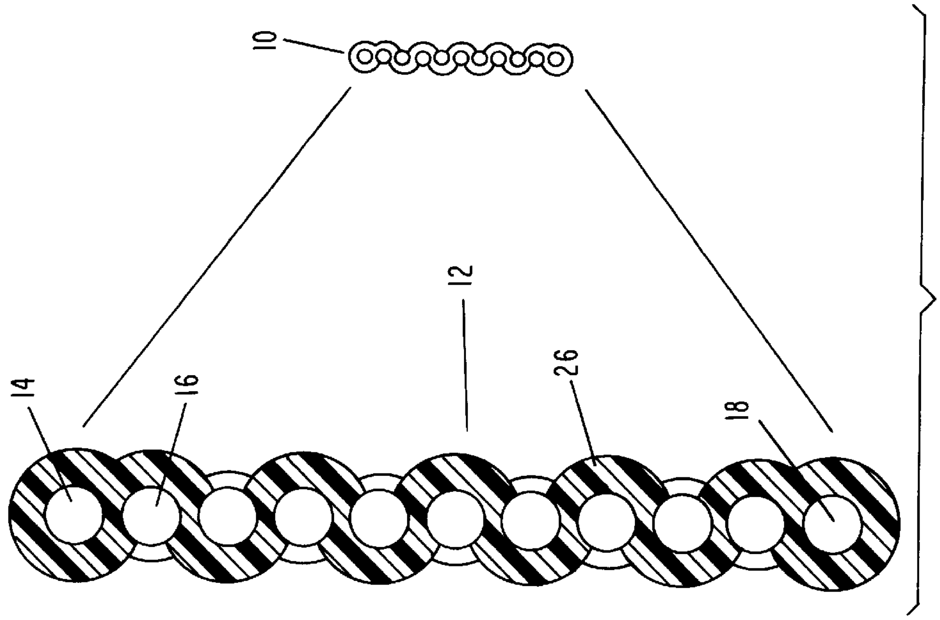
FIG. 3 is a sectional view of the molded woven cable.
Figure 1:
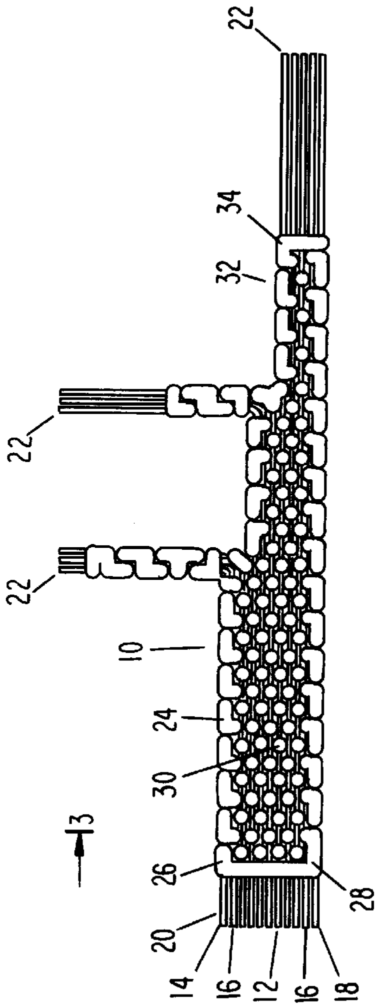
FIG. 1 is a top view of a molded woven cable showing a plurality of conductors with conductors exiting the cable at different location.
Figure 2:
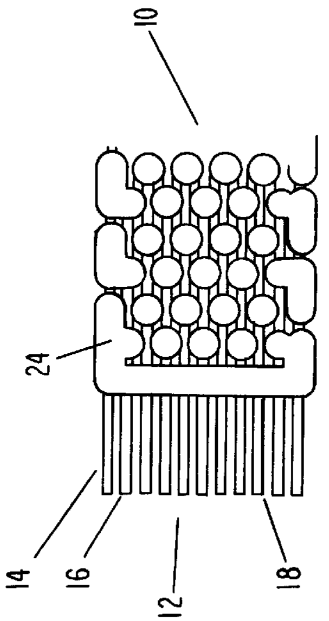
FIG. 2 is a bottom view of the beginning of the molded woven cable.

Referring now to, FIGS. 1 through 3, there is shown one preferred embodiment showing the principal characteristics for the molded woven cabling of the present invention. The molded woven cable 10 of this invention generally consists of a plurality of conductors 12 held in a space relationship by a woven plastic like compound 28.

The preferred embodiment and the best mode contemplated of the molded woven cabling and a method of production of the present invention are herein described. However, it should be understood that the best mode for carrying out the invention hereinafter described is offered by way of illustration and not by the way of limitation. It is intended that the scope of the invention include all modifications which incorporate its principal design features.

There can be as few as three conductors to an almost unlimited number of conductors included in the molded woven cabling 10 of this invention. Generally, the more conductors included the more complex the woven pattern becomes, especially if more than one layer is required. The conductors 12 can be generally referred to as a first conductor 14, second conductor 16, and continuing in this manner to a last conductor 18. The conductors 12 are held in a spaced relationship with each other by the plastic-like compound 24 interlaced with the conductors 12 in a woven pattern 30. The plastic-like compound 24 is a molding compound in the preferred embodiment.

For descriptive purposes, the woven pattern 30 of the plastic like compound can be described as a narrow strip 28 of the plastic like compound 24. However, in the preferred embodiment the narrow strips 28 are actually formed by a molten molding compound injected into a mold forming the woven pattern 30 along the entire length almost simultaneously. First, the plastic-like compound 24 forms a beginning base 26 around the conductors 12 near the beginning end 20 of the molded woven cable 10. This secures all the ends 20 of the conductors 12 in a spaced relationship. The narrow strip 28 is then woven over the first conductor 14, under the second conductor 16, over the third conductor and continuing in this weaving pattern until the last conductor 18 is included. The narrow strip 28 is then woven around the last conductor 18 and woven back over the conductors 12 in the opposite manner to the first conductor 14 weaving the conductors together and securing them in a spaced relationship. The weaving pattern is repeated to an ending position 32. The narrow strip 28 then forms an ending base 34 around all the conductors 12 that terminate near the ending position 32.

The beginning base 26 and the ending base 34 secure all the conductors together to maintain the spaced relationship to each other at the beginning and end of the molded woven cable 10. Without the bases 26 and 34, the conductors 12 would be free to lateral move down to the first woven strip of the plastic like compound. This could result in weakening the structure of the molded woven cable at these locations.

Figure 4:
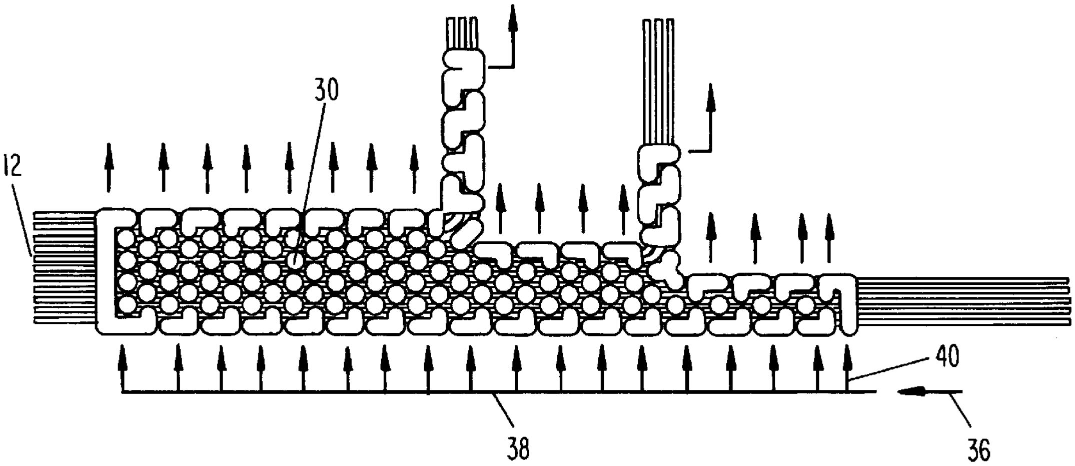
FIG. 4 is a representation of a mold holding a molded woven cable.

There are virtually unlimited configurations which can be made using the molded woven cable 10 of this invention and then method of production. As illustrated in FIGS. 1 and 4, there is a single beginning 20 and three separate ending locations 22. The exact configuration of the cable, the number and location of beginnings and endings, and the type of terminations would be determined by the particular application. The description and illustrations are not meant to limit the scope and application of this invention. There could be multiple entries and multiple exits in any given application. In addition, there could be multiple cables all configured differently in one apparatus.

Significant advantages are achieved by the molded woven cabling 10 of this invention. These include a greater flexibility, weight reduction, and repairability of conductors within the cable, just to name the most obvious. Since the conductors are not totally secured within a sheath, either wrapped or molded, the conductors have more freedom to move. The conductors 12 can slide between the narrow strip 28 within the woven pattern 30. This allows the cable a greater amount of flexibility than other type of cabling known in the art.

Since the plastic-like material only covers approximately half of the outer surfaces of the conductors 12 and the void areas between the conductors are not filled, only about half or less material is needed. Since only half the material is used the weight is significantly reduced.

Repairability of the conductors 12 within the molded woven cabling 10 is possible. This is do to the fact that the conductors 12 within the cabling 10 have the freedom to slide within the woven pattern 30 and about half of the outer surface of the conductors 12 can be observed. Therefore, the problem area can be readily observed and accessed. A single conductor, or more, can be pulled out of the woven pattern 30 and replaced back into the weave without destroying the integrity of the cable. This is not typically possible in the cabling currently known in the art. Typically, in the current art the sheathing has to removed or split in order to allow a person to observe and access a conductor contained within. Therefore, in most instances the entire cable is replaced rather then repaired.

As indicated above the, plastic-like compound 24 is a molding compound in the preferred embodiment. As shown in FIG. 4, the woven pattern 30, in the preferred embodiment, is formed by an injection molding process. A primary injection port is represented by reference numeral 36. The molten molding compound is injected into the primary injection port 36 and flows down through an injection channel 38 to individual injection ports 40. In the preferred embodiment as shown, each individual injection port 40 forms two narrow strips 28 of the plastic-like compound. All of the individual injection ports 40 should be injecting the molding compound into the woven pattern 30 at the same time. Therefore, all the narrow strips 28 should be formed at about the same time.

The excess molding compound exits through exit ports 42 on the opposite side of the molded woven cable 10 from the individual injection ports 40. The molded woven cabling 10 should not be complete unless there is an excess coming out of all exit ports 42. This ensures that all of the narrow strips 28 are completely formed before the mold 50 is removed.

Figure 5:
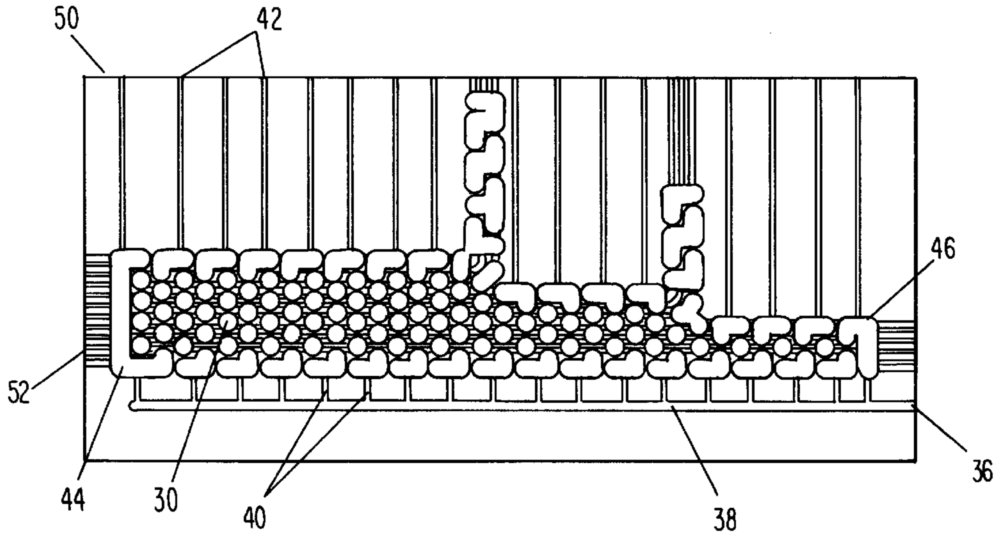
FIG. 5 is an illustration of a mold used to produce a molded woven cable of this invention.

The first step in the production of the woven molded cabling 10 of this invention is to create the mold 50, illustrated in FIG. 5. The mold 50 can be produced by any of several methods known in the art. The mold 50 will have slots 52, a woven pattern 30, injection ports 40 and exit ports 42. The slots 52 correspond to the size, number and desired configuration of the conductors 12 and the final cable 10 to be produced. The mold 50 will also have a primary injection port 36 for the receipt of the molding compound. In the preferred embodiment, there will be a primary injection port 36 leading to an injection channel 38. Individual injections ports 40 from the injection channel 38 will feed the woven pattern 30 at various points along the length. Typically, the points will corresponding to every other weave of the woven pattern. There will also be cutout area 44 for the beginning base 26 and cutout area 46 for the ending base 34.

Once the molds are complete, the next step would be to install the conductors 12 into the slots 52 and complete the assembly of the molds 52 with conductors 12 getting the assembly ready for the injection of the molding compound.

The molten molding compound would then be injected into the primary injection port 36 using any one of the injection processes known in the art. The molding compound would flow through the injection channel 38 into the individual injection ports 40 and into the woven pattern 30. Once the woven pattern 30 is completely filled, the excess molding compound would exit the exit ports 42.

Then depending on the particular molding compound, a curing cycle may be initiated to allow the molding compound to properly set and harden. Once properly cured the mold 50 can be removed leaving a woven molded cable 10. The excess and any flashing would have to be cleaned to provide the completed and finished product.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A method of manufacturing a molded cable comprising at least two elongate conductors, comprising the steps of:

providing a mold having a plurality of aligned and spaced apart slots, each slot being respectively sized and shaped to receive a corresponding conductor, said mold having a channel with a woven path that interlaces with said plurality of slots to define a woven pattern, and an injection port for injection therethrough of a molding compound into said channel;

arranging a plurality of conductors in said plurality of slots, respectively;

injecting a molding compound via said injection port into said channel and flowing said molding compound along said woven path to interlace said molding compound with said plurality of conductors in the woven pattern; and curing the injected molding compound in a molded relationship with said conductors to form a length of molded cable with said molding compound woven through and separating said plurality of conductors.

2. The method according to claim 1, wherein:

the molding compound comprises a silicone material.

3. The method according to claim 1, wherein:

the molding compound comprises a polyurethane material.

4. The method of manufacturing a molded cable as set forth in claim 1 in which the woven pattern provides a path for the molding compound to flow forming a beginning base around said conductors, then over a first conductor, under a second conductor, over a third conductor and continuing in this woven pattern until the last conductor is included, then around the last conductor and flowing back over said conductors in the opposite manner to said first conductor, and repeating this woven pattern to an ending position, and forming an ending base around said conductors near said ending position.

5. The method of manufacturing a molded cable as set forth in claim 1, wherein said step of flowing said molding compound includes covering approximately half of an outer surface of said plurality of conductors with said molding compound.

6. The method of manufacturing a molded cable as set forth in claim 1, wherein said mold includes a plurality of injection ports spaced along said channel for injection therethrough of said molding compound into said channel, and said step of injecting said molding compound includes injecting said molding compound through each of said plurality of injection ports.

* * * * *